US012567962B2

(12) United States Patent
van Vredendaal et al.

(10) Patent No.: US 12,567,962 B2
(45) Date of Patent: Mar. 3, 2026

(54) METHOD FOR POST-QUANTUM SECURE IN-THE-FIELD TRUST PROVISIONING

(71) Applicant: NXP B.V., Eindhoven (NL)

(72) Inventors: Christine van Vredendaal, Veldhoven (NL); Björn Fay, Brande-Hörnerkirchen (DE); Mario Lamberger, Graz (AT)

(73) Assignee: NXP B.V., Eindhoven (NL)

( * ) Notice: Subject to any disclaimer, the term of this patent is extended or adjusted under 35 U.S.C. 154(b) by 545 days.

(21) Appl. No.: 18/183,310

(22) Filed: Mar. 14, 2023

(65) Prior Publication Data

US 2024/0313963 A1    Sep. 19, 2024

(51) Int. Cl.
*H04L 29/06* (2006.01)
*H04L 9/08* (2006.01)
*H04L 9/32* (2006.01)

(52) U.S. Cl.
CPC .......... *H04L 9/0894* (2013.01); *H04L 9/0891* (2013.01); *H04L 9/3263* (2013.01)

(58) Field of Classification Search
None
See application file for complete search history.

(56) References Cited

U.S. PATENT DOCUMENTS

| | | |
|---|---|---|
| 9,690,941 B2 | 6/2017 | Thom |
| 11,265,214 B2 | 3/2022 | Yocam |
| 2010/0275029 A1 | 10/2010 | Little et al. |

| | | | |
|---|---|---|---|
| 2014/0068246 A1* | 3/2014 | Hartley | ................. H04L 9/0866 |
| | | | 713/176 |
| 2014/0164779 A1* | 6/2014 | Hartley | ................. H04L 9/0866 |
| | | | 713/176 |
| 2016/0171223 A1* | 6/2016 | Covey | .................. G06F 9/4401 |
| | | | 713/189 |

(Continued)

FOREIGN PATENT DOCUMENTS

| | | |
|---|---|---|
| CA | 2571891 A1 | 6/2008 |
| DE | 102018009365 A1 | 6/2020 |
| DE | 102021001919 A1 | 7/2021 |

OTHER PUBLICATIONS

David A. Cooper, Daniel Apon, Quynh Dang, Michal Davidson, Morris Dworkin, and Carl A. Miller, Recommendation for stateful hash-based signature schemes, 2019.

(Continued)

*Primary Examiner* — Andrew J Steinle

(57) ABSTRACT

A method for provisioning a plurality of IC devices, the method including: providing, by a first entity, the plurality of IC devices; storing, by the first entity, in one of the plurality of IC devices used as a provisioning device, one or more keys, and a public key, wherein the one or more keys include a reprovisioning key for reprovisioning the remaining IC devices; installing, by the first entity, provisioning software in the provisioning device; signing, by the first entity, provisioning software using a private key, the private key corresponding to the public key; provisioning the remaining IC devices by the provisioning device including providing cryptographic assets to the remaining IC devices, wherein the cryptographic assets include cryptographic code and keys; and reserving space in the remaining IC devices for reprovisioning the remaining IC devices with updated cryptographic assets.

20 Claims, 1 Drawing Sheet

(56)        References Cited

U.S. PATENT DOCUMENTS

2022/0109667 A1    4/2022  Gorog
2023/0063743 A1    3/2023  Fay et al.

OTHER PUBLICATIONS

Microsoft, How to control windows update delivery optimization, https: //support .microsoft. com/en-us/windows/windows-update-delivery-optimization-and-privacy-bf86a244-8f26-a3c7-a137-a43bfbe6.
National Institute of Standards and Technology, Post-quantum cryptography standardization, https://csrc.nist. gov/Projects/Post-Quantum-Cryptography/Post-Quantum-Cryptography-Standardization.
U.S. Appl. No. 17/587,903, filed Jan. 28, 2022.
U.S. Appl. No. 17/587,868, filed Jan. 28, 2022.
U.S. Appl. No. 17/445,742, filed Aug. 24, 2021.

* cited by examiner

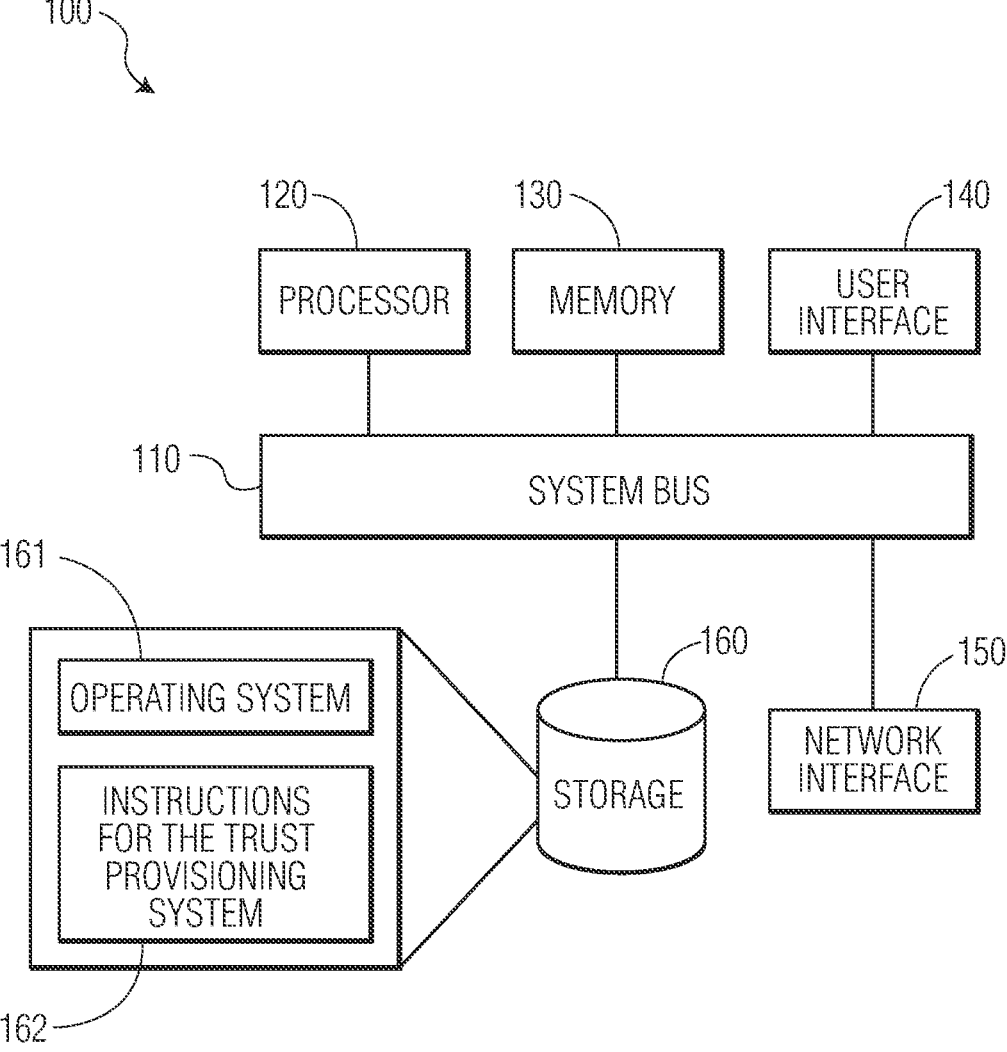

METHOD FOR POST-QUANTUM SECURE IN-THE-FIELD TRUST PROVISIONING

FIELD OF THE DISCLOSURE

Various exemplary embodiments disclosed herein relate to a method for post-quantum secure in-the-field trust provisioning.

BACKGROUND

For some applications, devices built now might be in the field for decades. There is a possibility that in this time span the usage of a quantum computer by an attacker becomes feasible. Simply provisioning post-quantum cryptography (PQC) keys now is not possible, because it is unclear which PQC algorithms will be standardized, or where standards are becoming clearer, whether the algorithm details will change before final standardization.

SUMMARY

A summary of various exemplary embodiments is presented below.

Various embodiments relate to a method for provisioning a plurality of IC devices, the method comprising: providing, by a first entity, the plurality of IC devices; storing, by the first entity, in one of the plurality of IC devices used as a provisioning device, one or more keys, and a public key, wherein the one or more keys include a reprovisioning key for reprovisioning the remaining IC devices; installing, by the first entity, provisioning software in the provisioning device; signing, by the first entity, provisioning software using a private key, the private key corresponding to the public key; provisioning the remaining IC devices by the provisioning device including providing cryptographic assets to the remaining IC devices, wherein the cryptographic assets include cryptographic code and keys; and reserving space in the remaining IC devices for reprovisioning the remaining IC devices with updated cryptographic assets.

Various embodiments are described, further including: receiving, by the provisioning device, the cryptographic assets wherein the cryptographic assets are encrypted assets from a second entity, wherein a provisioning software verifies the encrypted assets of the second entity.

Various embodiments are described, wherein the key for reprovisioning the remaining IC devices is a symmetric key.

Various embodiments are described, wherein the key for reprovisioning the remaining IC devices is a private key wherein an associated public key is kept secret.

Various embodiments are described, wherein the key for reprovisioning the remaining IC devices is a private key using on of extended Merkle Signature Scheme (XMSS) and Leighton-Micali Signatures (LMS) cryptography.

Various embodiments are described, further including: provisioning an additional device, wherein the additional device includes cryptographic assets to further reprovision the remaining IC devices.

Various embodiments are described, wherein the additional device is protected by one of version counter that is compared to a threshold counter value, locking the additional device after it is used for reprovisioning, authenticating the reprovisioning with a reprovisioning key installed by the first entity, and physical protection from a malicious actor.

Various embodiments are described, wherein the provisioning device is substantially functionally the same as the remaining IC devices.

Various embodiments are described, wherein the updated cryptographic assets are post quantum cryptography assets.

Various embodiments are described, wherein the provisioning device operates as an intermediary certificate authority.

Various embodiments are described, further including: receiving updated cryptographic assets by the provisioning device; encrypting the updated cryptographic assets using a reprovisioning key; determining that the remaining IC devices have the space to store the encrypted updated cryptographic assets; storing, by the provisioning device, the encrypted updated cryptographic assets in the remaining IC devices; decrypting, by the remaining IC devices, the encrypted updated cryptographic assets using a cryptographic key associated with the reprovisioning key; and deploying the updated cryptographic assets in the remaining IC devices.

Various embodiments are described, wherein the updated cryptographic assets are post quantum cryptography assets.

Further various embodiments relate to a method for reprovisioning a plurality of integrated circuit (IC) devices wherein the plurality of IC devices includes a provisioning device configured to provision the remaining IC devices of the plurality of devices, the method including: receiving updated cryptographic assets by the provisioning device; encrypting the updated cryptographic assets using a reprovisioning key; determining that the remaining IC devices have space to store the encrypted updated cryptographic assets; storing, by the provisioning device, the encrypted updated cryptographic assets in the remaining IC devices; decrypting, by the remaining IC devices, the encrypted updated cryptographic assets using a cryptographic key associated with the reprovisioning key; and deploying the updated cryptographic assets in the remaining IC devices.

Various embodiments are described, further including clearing a user-space when the space to store the encrypted updated assets includes the user-space.

Various embodiments are described, further including authenticating the received updated cryptographic assets using a provisioned authentication key.

Various embodiments are described, wherein the updated cryptographic assets include a key generation code.

Various embodiments are described, wherein the remaining IC devices generate a secret key based upon the key generation code.

Various embodiments are described, wherein the updated cryptographic assets are post quantum cryptography assets.

Various embodiments are described, further including: disabling previously provisioned cryptographic assets in the remaining IC devices.

Various embodiments are described, wherein the provisioning device is substantially functionally the same as the remaining IC devices.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying FIGURES. Each of the FIGURES is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 1 illustrates an exemplary hardware device for implementing trust provisioning system and method.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of methods and systems for in-the-field trust provisioning will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

For some applications, devices built now might be in the field for decades. There is a possibility that in this time span the usage of a quantum computer by an attacker becomes feasible. Simply provisioning post-quantum cryptography (PQC) keys now is not possible, because it is unclear which PQC algorithms will be standardized, or where standards are becoming clearer, whether the algorithm details will change before final standardization. At the same time, keys and updater read only memory (ROM) code for PQC are large and on constrained devices cannot simply replace the ECC/

RSA keys due to space constraints. Additionally updating over the air might not be possible or desirable due to security risks.

A system and method are proposed that leverages a dedicated device to generate and upload keys and data to update another device to PQC capabilities in the field. This is accomplished in a way that keeps the specific PQC algorithm flexible, and the update may be performed when the device is already in the field.

In a Trust Provisioning (TP) process, secret keys are installed in the (secure) memory of a device after its production. Generally one or many RSA/ECC key-pairs are created for public key cryptography. Additionally, symmetric keys may be provisioned for use in the field. Devices provisioned in the field now, along with their keying material, may be used in the field for up to 20 years.

A threat to this public key infrastructure (PKI) provisioning system are the advances being made in quantum computing. A full-scale quantum computer is believed to be able to recover Rivest-Shamir-Adleman (RSA) or elliptic-curve cryptography (ECC) secret keys from their public counterparts, and thereby removing the security of the provisioned devices. To secure future devices, efforts are going into post-quantum cryptography, i.e. public key cryptography, that can withstand attacks even by a quantum adversary. Standardization bodies such as the National Institute of Standards and Technology (NIST) are working towards standardizing a set of schemes that are recommended to be used.

Key updateability mechanisms exist but cannot simply update to post-quantum with the existing updater. Because this updater protects the integrity and authenticity with pre-quantum public key cryptography, an attacker can simply take the known public key, recover the secret key, and breach the confidentiality or forge a signature. Even if the assumption is made that this occurs after the first quantum computer, but before large-scale availability, an adversary could record the transaction and read the contents. Additionally, they are designed to update an advanced encryption standard (AES)/ECC/RSA key to the same type of key. In the case where this update includes new PQC private keys, this is of course a problem. Summarizing, updating to PQC keys comes with the following challenges. It is unclear to which PQC algorithm the devices will be updated. PQC keys are generally much larger than ECC/RSA keys and therefore they cannot simply be placed in the RSA/ECC current memory slots. Updates are often a broadcast of one signed update to many devices. Sending die-specific updates (with e.g., PQC keys) would pose a challenge. The size of PQC code for the updater mechanism is not negligible; the new sign/verify components may take 100(s) kB of extra space. Space is scarce on constrained devices, and over-the-air updates may not be possible or desirable.

An updater method and system will now be described that addresses these challenges. Other approaches for this problem were presented in U.S. patent application Ser. No. 17/587,903 filed Jan. 28, 2022, (the '903 application) and U.S. patent application Ser. No. 17/587,868 filed Jan. 28, 2022, (the '868 application) both of which are hereby incorporated by reference in their entirety as if included herein. The updater mechanism and system disclosed herein allows for increased capabilities versus the '903 and '868 applications.

For some applications devices built now might be in the field for decades. There is a possibility that in this time span the usage of a quantum computer by an attacker becomes feasible. One cannot simply start provisioning PQC keys now, because it is unclear whether the algorithm details will change before standardization. Additionally, for some use cases, a migration to PQC might never be necessary, but the option is good to have in case of an emergency situation. At the same time, keys and Updater ROM code for PQC is large and on constrained devices cannot simply replace the ECC/RSA keys due to space constraints.

The '868 and '903 applications describe an over-the-air (OtA) update method to perform the update. This means that they: do not work for devices that do not allow an over-the-air update; do not work for devices in an offline environment like a factory; can still carry risks like the public keys leaking; can still breach the integrity of the update; can carry risk of the OtA connection being subject to a denial of service (DOS) attack, especially if multiple round-trips are required.

In U.S. patent application Ser. No. 17/445,742 filed Aug. 24, 2021, (the '742 application), which is hereby incorporated by reference in its entirety as if included herein, a method is proposed to perform the provisioning of keys and code in an untrusted environment. This is done by, in a batch of N devices, configuring the N-th device to act as a provisioning device or cheap hardware security module (HSM). This N-th device may generate keys and upload data that will need to be provisioned to the other devices (in an unsecure environment). The '742 application however does not take into account the challenges that come with the PQC keys and data being large, does not take into account that what exactly to upgrade to (both size and algorithm) is not (fully) known yet, does not take into account that it needs to be provisioned/updated after the provisioning phase (it suggests that after the provisioning, the keys should be locked to prevent future (ab)use), and does not face the challenge of the N−1 devices being in different locations.

Note that the '742 application does not prevent someone from provisioning their own assets on the N−1 devices. Rather it prevents a malicious actor from provisioning similar, tampered assets, like back-doored cryptographic material. Therefore is protects the integrity and confidentiality of the update from outsiders.

Note that the system and method for trust provisioning disclosed herein may also apply to other types of cryptography other than PQC; in theory if a cryptographic function gets broken a similar mechanism may be used to update the cryptographic function to an alternative. The main application is however PQC, because in this situation it is known that the existing update mechanism is insecure, that an order of magnitude of the size of the desired update, and that quantum based attacks are coming (even though a user might never want to upgrade).

A system and method for trust provisioning will be disclosed that utilizes the ideas posed in '742 application to overcome the limitations of the '903 and '868 applications. An N-th device will be used that will be able to perform a full update to PQC of the N−1 other devices locally in a PQC secure manner. This adds considerations on locations, size, PQ-security of the provisioning, and revocability. In other words, how to build a re-provisioning device will be described to enable re-provisioning of offline devices or devices in the field in a PQC-secure manner. These will not make it feasible for certain use cases (e.g., IoT in the home), but enables updates in use cases (e.g. (offline) Industrial IoT, large local networks) where previous methods could not be used.

In its simplest form, the system and method of trust provisioning disclosed herein applies the '742 application to the concept of PQC trust provisioning to avoid concerns that occur with over-the-air updates.

The trust provisioning system and method carries out the following steps during different phases of operation (further details on steps are given below). In a first phase, at the time of manufacturing, the N devices need to be provisioned with the right keying material. These will be created in such a way that enables the re-provisioning of the N−1 devices by the Nth device at a later time. This provisioning will be performed in the same manner as in the '742 application, with the addenda that there might be a separate N+1-st device to revert the process (if the PQC algorithm is broken), the Nth and N+1-st device might be cloned and/or include multiple copies provisioned with the same key material and enough storage needs to be provisioned to be able to do updated provisioning at a later time to any feasible (this is a calculated risk) algorithm. Optionally this space may be marked as user space for now. Should the update never occur, the customer has a larger device memory. A second phase includes updated provisioning, which is when the OEM wants to use their Nth device to provision the N−1 devices with PQC. A third phase includes revocation which is an emergency brake if the provisioned material is broken. In the following description, details on the steps during the different phases are provided, and then some considerations of what should generally be taken into account in this post-quantum setting are described.

During manufacturing initial provisioning the trust provisioning system and method first provisions the N devices with necessary keys as in the '742 application. This provisions the N devices in such a way that at a later stage the Nth device may be provisioned with cryptographic assets (keys/code) by the OEM and that this Nth device may provision those assets to the N−1 devices, acting as a HSM. This includes installing key material in the N devices to create die-individual keys, a public key of the OEM to authenticate the later-provisioned assets from the OEM on the N'th device to the N−1 devices and keys that may be combined with an OEM share to encrypt/decrypt the assets on the N−1 devices. When only symmetric cryptography is used, the configuration of the Nth device may be the same as that of the N−1 devices. If public key cryptography is used, the configuration could theoretically be slightly different, but in practice it would still make sense to provision the same keypairs to all devices.

The manufacturer makes sure that the N−1 devices have the storage capability to store updated ROM code and PQC keys. This space may be determined by looking at the current NIST (selected and potentially-to-be-selected) candidates to be in the right ballpark, but additional memory should be reserved if the actual algorithms are broken. Optionally this space can be marked as user-space that may be used for non-critical user-applications, like audit storage. It is recommended to reserve this space on top of the currently used space; this leaves the option of switching to a hybrid approach of combining current with PQC as well.

The manufacturer may optionally provision an N+1-st device with reversion options. This N+1-st device would allow for a reversion back to the original or other cryptographic protocol.

When a quantum computer is built, or post-quantum standards have matured and a swap to post-quantum cryptography on the device is required, a re-provisioning of the N−1 devices may take place. Updated provisioning or reprovisioning may be carried out as follows. The sizes of the cryptographic assets to be provisioned to the N−1 devices are first determined. Then if the assets fit in the reserved PQC space of the N−1 devices reserved at manufacturing, then as described in the '742 application, the assets may directly be stored encrypted on the Nth device and when using it to reprovision the assets may be decrypted on the N−1 devices with a K_ENCK or K_ENCD keys, and authenticated with a K_AUTH key. Otherwise, if the PQC space was marked as user-space in the device and needs to be cleared to fit the update, do following steps: encrypt the data in the PQC space on each of the N−1 devices with K_ENCK or K_ENCD, and optionally authenticate with K_AUTH; back-up the encrypted blob on the Nth device; decrypt the assets delivered from the Nth device to the N−1 devices with the K_ENCK or K_ENCD keys and provisioned to the device (overwriting the user-space); and undo the marked user space, i.e., changing the user space's status so that it may be overwritten by the updated cryptographic assets.

If provisioning is not possible, then an error is indicated.

Optionally, in some use cases it might be desirable to keep secret keys on the N−1 device(s). For instance if they are generated by a physically unclonable function (PUF). In this case the Nth device can make a round trip to reduce storage. In the first round it provisions key-generation code to the N−1 devices, which the devices may utilize to generate the keys. This can thereafter be deleted and in a second round-trip signing and encapsulation, code may be provided. This is described in detail in the '905 and '868 applications. In some use cases the new key pairs might need a certificate; it is possible in this case to also configure the Nth device as an intermediary certificate authority (CA).

The trust provisioning system and method may then verify the PQC/hybrid functionality. A validation update round should be run to verify the correctness of the updated provisioning.

Optionally, the trust provisioning system and method may disable the classic cryptography functionality. This prevents rollback attacks. This disabling may be mandatory if the use case requires that the classic cryptographic algorithms shall not be used anymore. This may also be achieved by a future (OtA) firmware update to enable a transition period.

The backed-up data may be decrypted by the OEM and handled on a case by case basis, depending on the content.

If at some point the updated provisioning would need to be reversed, because for instance the provisioned PQC is broken, wrongly parameterized, or for another reason, then the trust provisioning system and method offers the option to re-provision. This can be done by re-setting the Nth device, as is suggested in the '742 application, but because in this case the devices are in the field, it is more convenient to have an N+1-st device at hand.

The trust provisioning system and method may revoke the updated provisioning by repeating the re-provisioning process to revert or update with the N+1-st device. This works the same as the previous step, only now the PQC cryptographic assets are either rolled back to the previous assets or replaced by the new (likely non-PQC) assets.

Note that the N+1-st device should be protected from abuse or rollback attacks; they should for instance not be able to employ it to roll back the initial update. This can be achieved by the following steps. A simple version counter may be used, which only allows provisioning by this method if the provisioned version is higher than the current version or some other counter threshold value. The device may be locked after provisioning. This may be a permanent lock, like a burnt fuse that disables use of the device or a temporary lock that may be lifted by e.g. access to a specific key. During first provisioning install an OEM key that is used to authenticate further updates. Finally, the N-th device may be physically protected from malicious actors.

Authentication in the trust provisioning system and method will now be described. The '742 application mentions that the authentication and encryption of the to-be-provisioned assets can occur in many ways, but AES GCM or AES CCM are recommended.

In the trust provisioning system and method the use of (classical) public key methods like RSA and ECC is insecure. If the public key is leaked, a N-th device may be forged because of the advent of quantum computing and the security of the trust provisioning system and method would be compromised. Therefor the use of symmetrical schemes should be used with of key length at least 256-bits based upon the currently understood security of symmetrical schemes. For example, the use of AES-128 is possible, but especially where N is large a security risk may result if a plaintext-ciphertext combination leaks.

The '742 application mentions that for the signing of the assets a security module may also install an ECC or RSA public key, where the corresponding private key will be used by the security module to sign the provisioning software. For the trust provisioning system and method, if this option is used, the public key must be kept secret, and the public key should be treated as if it is a secret key. Otherwise the security may be compromised. This concept is put forth in the '868 application. However if an authenticated encryption or an already post-quantum standardized scheme like eXtended Merkle Signature Scheme (XMSS) and Leighton-Micali Signatures (LMS) may be used instead, such use is strongly recommended.

The newly created key pair(s) of the device in some cases requires a certificate of authenticity. The N-th device may carry a signing key of some certificate chain and serve as an intermediary certificate authority. This is not possible with the OtA update mechanisms of the '903 and '868 applications.

If the device supports in-the-field ROM patching, then as above, space needs to be reserved that may be used for the patch later. Because ROM patching is often a risk, the trust provisioning system and method may mitigate the risks involved by: invalidating the N-th device after a certain amount of time to reduce the tampering time of an attacker; if the N devices have near-field communication (NFC), Bluetooth low energy (BLE) or ultra-wideband (UWB) capability, a mechanism could be built in to make sure the N-th device is physically present; and the N-th device could be configured to only work over a specific network, which does not only force locality, but allows for the patching of multiple devices from one location. Note that often ROM patching may only be performed by the device manufacturer. In this case updating would require provisioning of an additional manufacturer provisioning authentication key MAN_AUTH.

One challenge is that the N−1 devices might no longer be in the same location, as was the case in the '742 application. The following possible solutions may be implemented for this situation. If the devices are on the same network, it might be possible to update over that network. If it is a regularly serviced item, like a car, it could be updated by the maintainer during service. The N-th device may be cloned. The cost of N-th device may be decreased, such as making the N-th device to be a phone or some other device that might have an HSM. This increases portability, and could maybe be run along-side a regular application.

Although the trust provisioning system and method disclosed herein has been described for the use case of post-quantum cryptography, the trust provisioning system and method may be applied to any type of cryptographic agility requirements. For instance, if the device is currently running ECC, the trust provisioning system and method may also make sure that ECC could be securely replaced by an alternative, should ECC become broken.

FIG. 1 illustrates an exemplary hardware device 100 for implementing trust provisioning system and method. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 140 may include one or more devices for enabling communication with a user such as an administrator. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 160 may store instruction 162 for implementing the trust provisioning system and method.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

The system bus 110 allows communication between the processor 120, memory 130, user interface 140, storage 160, and network interface 150.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method for provisioning a plurality of IC devices, the method comprising:
    providing, by a first entity, the plurality of IC devices;
    storing, by the first entity, in one of the plurality of IC devices used as a provisioning device, one or more keys, and a public key, wherein the one or more keys include a reprovisioning key for reprovisioning the remaining IC devices;
    installing, by the first entity, provisioning software in the provisioning device;
    signing, by the first entity, provisioning software using a private key, the private key corresponding to the public key;
    provisioning the remaining IC devices by the provisioning device including providing cryptographic assets to the remaining IC devices, wherein the cryptographic assets include cryptographic code and keys; and
    reserving space in the remaining IC devices for reprovisioning the remaining IC devices with updated cryptographic assets.

2. The method of claim 1, further comprising:
    receiving, by the provisioning device, the cryptographic assets wherein the cryptographic assets are encrypted assets from a second entity,
    wherein a provisioning software verifies the encrypted assets of the second entity.

3. The method of claim 1, wherein the key for reprovisioning the remaining IC devices is a symmetric key.

4. The method of claim 1, wherein the key for reprovisioning the remaining IC devices is a private key wherein an associated public key is kept secret.

5. The method of claim 1, wherein the key for reprovisioning the remaining IC devices is a private key using on of extended Merkle Signature Scheme (XMSS) and Leighton-Micali Signatures (LMS) cryptography.

6. The method of claim 1, further comprising:
    provisioning an additional device, wherein the additional device includes cryptographic assets to further reprovision the remaining IC devices.

7. The method of claim 6, wherein the additional device is protected by one of version counter that is compared to a threshold counter value, locking the additional device after it is used for reprovisioning, authenticating the reprovisioning with a reprovisioning key installed by the first entity, and physical protection from a malicious actor.

8. The method of claim 1, wherein the provisioning device is substantially functionally the same as the remaining IC devices.

9. The method of claim 1, wherein the updated cryptographic assets are post quantum cryptography assets.

10. The method of claim 1, wherein the provisioning device operates as an intermediary certificate authority.

11. The method of claim 1, further comprising:
    receiving updated cryptographic assets by the provisioning device;
    encrypting the updated cryptographic assets using a reprovisioning key;
    determining that the remaining IC devices have the space to store the encrypted updated cryptographic assets;
    storing, by the provisioning device, the encrypted updated cryptographic assets in the remaining IC devices;
    decrypting, by the remaining IC devices, the encrypted updated cryptographic assets using a cryptographic key associated with the reprovisioning key; and
    deploying the updated cryptographic assets in the remaining IC devices.

12. The method of claim 11, wherein the updated cryptographic assets are post quantum cryptography assets.

13. A method for reprovisioning a plurality of integrated circuit (IC) devices wherein the plurality of IC devices includes a provisioning device configured to provision the remaining IC devices of the plurality of devices, the method comprising:
    receiving updated cryptographic assets by the provisioning device;
    encrypting the updated cryptographic assets using a reprovisioning key;
    determining that the remaining IC devices have space to store the encrypted updated cryptographic assets;
    storing, by the provisioning device, the encrypted updated cryptographic assets in the remaining IC devices;
    decrypting, by the remaining IC devices, the encrypted updated cryptographic assets using a cryptographic key associated with the reprovisioning key; and
    deploying the updated cryptographic assets in the remaining IC devices.

14. The method of claim 13, further comprising clearing a user-space when the space to store the encrypted updated assets includes the user-space.

15. The method of claim 13, further including authenticating the received updated cryptographic assets using a provisioned authentication key.

16. The method of claim 13, wherein the updated cryptographic assets include a key generation code.

17. The method of claim 16, wherein the remaining IC devices generate a secret key based upon the key generation code.

18. The method of claim 13, wherein the updated cryptographic assets are post quantum cryptography assets.

19. The method of claim 13, further comprising:

disabling previously provisioned cryptographic assets in the remaining IC devices.

20. The method of claim 13, wherein the provisioning device is substantially functionally the same as the remaining IC devices.

\* \* \* \* \*